(12) United States Patent
Moriarty et al.

(10) Patent No.: US 10,369,679 B2
(45) Date of Patent: *Aug. 6, 2019

(54) APPARATUS, SYSTEM AND METHOD FOR PERFORMING AUTOMATED FINISHING OPERATIONS ON A WORKPIECE

(71) Applicant: The Boeing Company, Chicago, IL (US)

(72) Inventors: Bennett M. Moriarty, Bothell, WA (US); Phillip J. Crothers, Hampton East (AU); Shane E. Arthur, Kirkland, WA (US); Brian W. Smith, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 454 days.

This patent is subject to a terminal disclaimer.

(21) Appl. No.: 15/347,485

(22) Filed: Nov. 9, 2016

(65) Prior Publication Data

US 2018/0126514 A1    May 10, 2018

(51) Int. Cl.
  *B24B 51/00* (2006.01)
  *B24B 19/26* (2006.01)
  *B05B 13/00* (2006.01)
  *B05B 13/04* (2006.01)
  *B64F 5/10* (2017.01)
  *B25J 5/00* (2006.01)

(52) U.S. Cl.
  CPC ............ *B24B 51/00* (2013.01); *B05B 13/005* (2013.01); *B05B 13/0436* (2013.01);
  (Continued)

(58) Field of Classification Search
  None
  See application file for complete search history.

(56) References Cited

U.S. PATENT DOCUMENTS 5,860,208 A * 1/1999 Nomura ............ H05K 13/0406
                                                     29/740
6,439,096 B1    8/2002 Mungalov et al.
(Continued)

FOREIGN PATENT DOCUMENTS

EP        0341134 A1    11/1989
EP        2939931 A1    11/2015
WO    WO-2014/143917 A1    9/2014

OTHER PUBLICATIONS

Search Report for related European Application No. EP17185870.7; report dated Jan. 9, 2018.

(Continued)

*Primary Examiner* — Shamim Ahmed
*Assistant Examiner* — Bradford M Gates
(74) *Attorney, Agent, or Firm* — Miller, Matthias & Hull LLP

(57) ABSTRACT

A finishing apparatus for performing an automated finishing operation on a surface of a workpiece is disclosed. The finishing apparatus may include a platen fabricated from a magnetic material and having a platen surface, and a finishing module disposed on the platen surface and having a finishing operation end effector. The finishing module may generate a magnetic field that biases the finishing module toward the platen, and may be operable to generate a magnetic flux to control movement of the finishing module over the platen surface to perform the automated finishing operation on the surface of the workpiece.

20 Claims, 8 Drawing Sheets

(52) U.S. Cl.
CPC .............. *B24B 19/26* (2013.01); *B25J 5/00* (2013.01); *B64F 5/10* (2017.01); *B05B 13/0431* (2013.01)

(56) References Cited

U.S. PATENT DOCUMENTS

| | | | |
|---|---|---|---|
| 7,135,827 | B1 | 11/2006 | Lampson |
| 7,148,590 | B1 | 12/2006 | Lampson |
| 10,184,813 | B2 * | 1/2019 | Crothers ............... G01D 11/30 |
| 2015/0153312 | A1 * | 6/2015 | Gonzalez ............... G01D 5/00 73/23.2 |
| 2016/0243702 | A1 | 8/2016 | Crothers |

OTHER PUBLICATIONS

Anonymous: "Nelson Air—Air Bearing Primer", Dec. 11, 2001 (Dec. 11, 2001), XP055433777, Retrieved from the Internet: URL:https://web.archive.org/web/20011211232108/http://www.nelsonair.com/NA_primer.htm [retrieved on Dec. 11, 2017].

Lauwers T B et al: "Free-roaming planar motors: toward autonomous precision planar mobile robots", Robotics and Automation, 2004. Proceedings. ICRA '04. 2004 IEEE International Conference on New Orleans, LA, USA Apr. 26-May 1, 2004, Piscataway, NJ, USA,IEEE, US, vol. 5, Apr. 26, 2004 (Apr. 26, 2004), pp. 4498-4503, XP010768102, DOI: 10.1109/ROBOT.2004.1302426, ISBN: 978-0-7803-8232-9.

Yordan Kyosev; "Advances in Braiding Technology: Specialized Techniques and Applications (Woodhead Publishing Series in Textiles)" 2016; ISBN 0081004265, 9780081004265; length—608 pages.

C. Elbuke, et al; "Design of floating micro-electro-mechanical (MEMS) systems" 2016; https://uwaterloo.ca/maglev-microrobotics-laboratory/research/design-floating-micro-electro-mechanical-mems-systems.

Scott Ellerthorpe; "Linear motors step out"; Aug. 1, 2000; http://machinedesign.com/linear-motion/linear-motors-step-out.

* cited by examiner

APPARATUS, SYSTEM AND METHOD FOR PERFORMING AUTOMATED FINISHING OPERATIONS ON A WORKPIECE

TECHNICAL FIELD

The present disclosure relates generally to performing finishing operations on workpieces and, more particularly, to methods and systems for automating finishing operations using finishing operation end effectors mounted on linear motors to traverse and perform the finishing operations on surfaces of the workpieces.

BACKGROUND

Many structures, such as but not limited to components of aircraft, have finishing operations such as painting, printing and quality inspections performed thereon at least in part as manual processes. Skilled operators, such as painters, letterers and inspectors, can perform these operations with relatively high degrees of quality and accuracy. However, such manual processing can have inherent limits in terms of performance criteria such as time to completion of each operation, accuracy in painting and printing to apply a multi-color design to the surface of the workpiece, and maintaining quality in the application of intricate designs to the surface.

SUMMARY OF THE DISCLOSURE

In one aspect of the present disclosure, a finishing apparatus for performing an automated finishing operation on a surface of a workpiece is disclosed. The finishing apparatus includes a platen fabricated from a magnetic material and having a platen surface, and a finishing module disposed on the platen surface and having a finishing operation end effector. The finishing module generates a magnetic field that biases the finishing module toward the platen, and is operable to generate a magnetic flux to control movement of the finishing module over the platen surface to perform the automated finishing operation on the surface of the workpiece.

In another aspect of the present disclosure, a method of performing an automated finishing operation on a surface of a workpiece is disclosed. The method is implemented using a finishing module having a finishing operation end effector and being disposed on a platen surface of a platen fabricated from a magnetic material, wherein the finishing module generates a magnetic field biasing the finishing module toward the platen surface. The method includes controlling, using a magnetic flux generated by the finishing module, movement of the finishing module, and performing, using the finishing operation end effector, the automated finishing operation.

In a further aspect of the present disclosure, a system for performing an automated finishing operation on a surface of a workpiece is disclosed. The system includes a platen fabricated from a magnetic material and having a platen surface, a finishing module disposed on the platen surface and having a finishing operation end effector, and a finishing module controller coupled in communication with the finishing module. The finishing module generates a magnetic field that biases the finishing module toward the platen, and is operable to generate a magnetic flux to control movement of the least one finishing module over the platen surface to perform the automated finishing operation on the surface of the workpiece. The finishing module controller is configured to control the magnetic flux generated by the finishing module to move the finishing module over the platen surface to perform the automated finishing operation.

Additional aspects are defined by the claims of this patent.

DETAILED DESCRIPTION

In apparatus, systems and methods in accordance with the present disclosure, finishing operations for workpieces that previously were performed in part or entirely manually are automated. As described further herein, finishing operation end effectors are mounted on linear motors that can be directed along paths across surfaces of workpieces as the end effectors perform their finishing operations. The finishing operation end effectors and the linear motors are components of a finishing apparatus having a platen or a plate over which the linear motors travel. The finishing apparatus may be positioned proximate the surfaces of the workpieces by positioning apparatus at a finishing station. Once the finishing apparatus 10 is in position proximate the workpieces, the linear motors are controlled to move over the plate and across the surfaces so that the finishing operation end effectors can perform their finishing operations on the workpiece.

Figure 1:
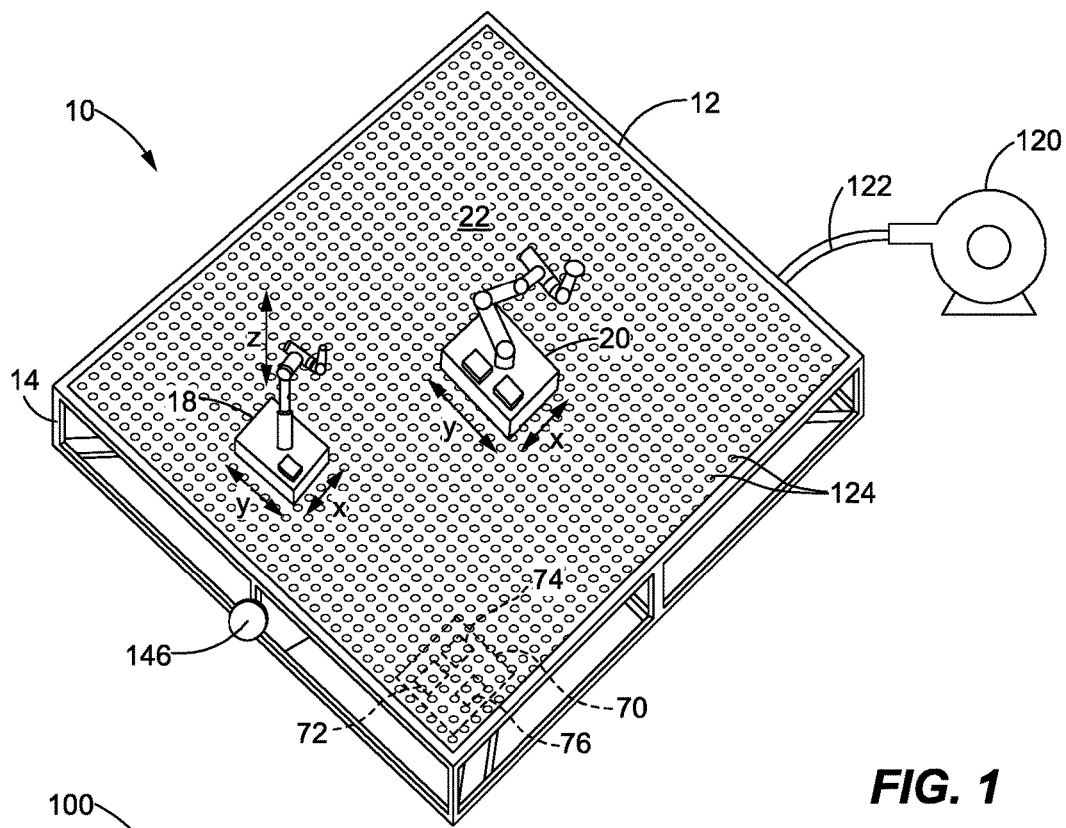
FIG. 1 is a perspective view of an embodiment of a finishing apparatus in accordance with the present disclosure for performing finishing operations on surfaces of workpieces.

FIG. 1 illustrates one example of a finishing apparatus 10 in accordance with the present disclosure. The finishing apparatus 10 as shown includes a flat platen 12 fabricated from a magnetic material and mounted on a mounting bracket 14. The mounting bracket 14 may be a component of a positioning apparatus 136 (FIG. 5) that is illustrated and described further below with reference to FIG. 4. The finishing apparatus 10 further includes at least one finishing module 18 and/or at least one finishing module 20 disposed on a planar platen surface 22 of the platen 12. The finishing modules 18, 20 are configured with linear motors so that the finishing modules 18, 20 can be controlled to move in an X-direction and a Y-direction over the platen surface 22 so that finishing operations can be performed on a surface of a workpiece proximate to which the finishing apparatus 10 is disposed.

Figure 2:
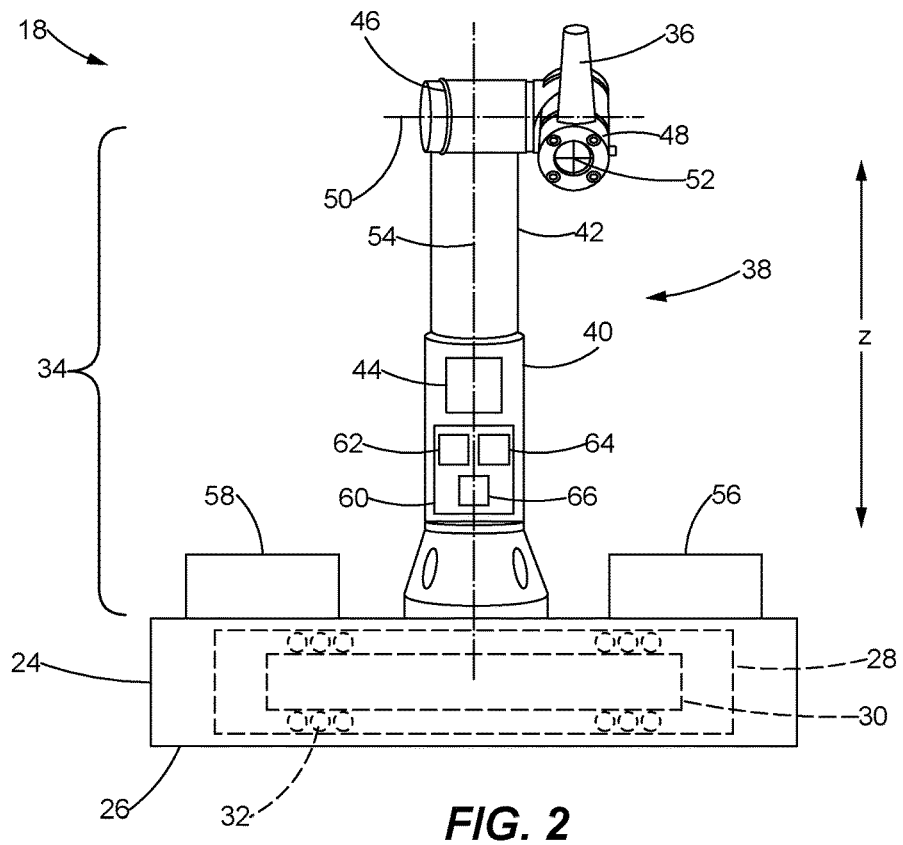
FIG. 2 is a side view of an embodiment of a finishing module in accordance with present disclosure of the finishing apparatus of FIG. 1.

An embodiment of the finishing module 18 is illustrated in greater detail in FIG. 2. In addition to moving over the platen surface 22, the finishing module 18 is configured to perform finishing operations on surfaces of workpieces. As illustrated, the finishing module 18 includes module base 24 having a planar bottom surface 26 that faces the platen surface 22 when the finishing module 18 is disposed on the platen 12. The module base 24 houses a linear motor 28 in the form of a Sawyer motor that includes a permanent magnet 30 and a phase winding 32. The permanent magnet 30 creates a magnetic force that biases the finishing module 18 toward the platen 12, and the phase winding 32 creates magnetic flux when a current runs through the wires of the winding 32. The magnetic flux will move the finishing module 18 over the platen surface 22 as described further below. In alternative embodiments, the permanent magnets 30 may be omitted, and the platen 12 may carry a permanent magnet that will interact with the magnetic flux created by the winding 32 in each module base 24 to move the finishing modules 18 over the platen surface 22. While Sawyer motors are illustrated and described herein, any appropriate linear motor capable of being controlled to provide two-dimensional motion of the finishing module 18 over the platen surface 22 is contemplated as having use in finishing apparatus 10 in accordance with present disclosure.

The finishing module 18 further includes an end effector positioning device 34 mounted on the module base 24 for positioning of a finishing operation end effector 36 of the finishing module 18 relative to the module base 24 and to a surface of a workpiece. The end effector positioning device 34 in the illustrated embodiment includes a telescoping arm 38 mounted to and extending from the module base 24. The telescoping arm 38 includes a lower tubular portion 40 and an upper tubular portion 42 slidably disposed within the lower tubular portion 40 so that the upper tubular portion 42 can slide in and out to retract and extend, respectively, the telescoping arm 38. The telescoping arm 38 may further include a linear actuator 44 operatively connected between the upper tubular portion 42 and either the lower tubular portion 40 or the module base 24 to control the position of the upper tubular portion 42 relative to the lower tubular portion 40. The linear actuator 44 may be any appropriate type of linear actuator for causing linear movement of the upper tubular portion 42, such as mechanical actuators using a screw or cam, a hydraulic or pneumatic actuators using pressure changes in liquid or air, respectively, to extend and retract the upper tubular portion 42, piezoelectric actuators, solenoid actuators, electro-mechanical actuators and the like.

The end effector positioning device 34 may further include two rotary actuators 46, 48 for controlling a rotational orientation of the finishing operation end effector 36. The first rotary actuator 46 may be attached at an end of the upper tubular portion 42 opposite the lower tubular portion 40 and the module base 24, and the second rotary actuator 48 may be mounted to an output shaft (not shown) of the first rotary actuator 46. The finishing operation end effector 36 may be operatively connected to an output shaft (not shown) of the second rotary actuator 48. The first rotary actuator 46 may operate to rotate the second rotary actuator 48 and the finishing operation end effector 36 about a first rotational axis 50, and the second rotary actuator 48 may operate to rotate the finishing operation end effector 36 about a second rotational axis 52.

In one embodiment, the first rotational axis 50 may be approximately parallel to the planar bottom surface 26 of the module base 24 and approximately perpendicular to an arm longitudinal axis 54 of the telescoping arm 38. The second rotational axis 52 may be approximately perpendicular to the first rotational axis 50. This arrangement allows three degrees of freedom for positioning in the finishing operation end effector 36 relative to the surface of the workpiece. Actuation of the linear actuator 44 to extend and retract the telescoping arm 38 to move the finishing operation end effector 36 toward or away from the workpiece parallel to the arm longitudinal axis 54 and in the Z-direction relative to the platen 12 (FIG. 1). Actuation of the rotary actuators 46, 48 adjusts the orientation of the finishing operation end effector 36 to correspond to contours of the surface of the workpiece. Of course, the arm longitudinal axis 54 and the rotational axes 50, 52 may have different relative orientations while still providing three degrees of freedom of movement to position the finishing operation end effector 36 as required for a particular implementation of the finishing apparatus 10.

As discussed above, the finishing operation end effector 36 may be operatively connected to the output shaft of the second rotary actuator 48. In the illustrated embodiment, the finishing operation end effector 36 is a medium dispensing end effector that operates to deposit a print or coloring medium on the surface of the workpiece. The finishing operation end effector 36 is self-contained on the illustrated finishing module 18, so the finishing module 18 also includes a medium reservoir 56 mounted thereon that may be placed in fluid communication with the finishing operation end effector 36 by an appropriate conduit. As an example, the finishing operation end effector 36 may be a paint nozzle and the medium reservoir 56 may be a paint reservoir for painting the surface of the workpiece. In other embodiments, the finishing operation end effector 36 may be an ink jet printer head and the medium reservoir 56 may be one or more ink cartridges that can be used to print lettering and/or designs on the surface. Other types of medium dispensing end effectors may be installed on the finishing module 18. In further alternative embodiments, the finishing operation end effector 36 could be a sensing device, a machining tool such as sander, drill or grinder, or any other appropriate end effector for performing a finishing operation on the workpiece.

The finishing module 18 as illustrated is a self-contained, autonomous component of the finishing apparatus 10 requiring power and control capabilities. Consequently, the finishing apparatus 10 may further include a power source 58 such as a battery pack mounted thereon. The power source 58 may be replaceable so that a charged power source 58 may be swapped in for a partially or fully spent power source 58 when necessary. In alternate implementations, the power source 58 may be permanently mounted to the finishing module 18 and rechargeable when necessary. The rechargeable power source 58 may have an appropriate connector (not shown) for attaching a recharging cord for supplying power to recharge the power source 58. The rechargeable power source 58 could alternatively be configured for wireless power transfer via a technique such as inductive coupling. The power from the power source 58 may be transmittable to the winding 32, the finishing operation end effector 36 and the actuators 44, 46, 48 via appropriate power transfer hardware and wiring.

The finishing module 18 may further include a finishing module controller 60 mounted thereon and configured to control the operations of the various components of the finishing module 18. The finishing module controller 60 may include a processor 62 for executing a specified program or programs that control and monitor various functions associated with the finishing module 18, such as operating the linear motor 28 to move the finishing module 18 and actuating the actuators 44, 46, 48 to position the finishing operation end effector 36. Although the processor 62 is shown, it is also possible and contemplated to use other electronic components such as a microcontroller, an ASIC (application specific integrated circuit) chip, or any other integrated circuit device. The finishing module controller 60 further includes a memory 64 that can include read only memory (ROM) for storing programs and random access memory (RAM) that serves as a working memory area for use in executing the programs stored in ROM. The finishing module controller 60 may also include a communications module 66 such as transceiver that is capable of communicating wirelessly with other control elements of the finishing apparatus 10, such as finishing module controllers 60 in other finishing modules 18 and a finishing apparatus controller 70 (FIG. 1) of the finishing apparatus 10. The finishing apparatus controller 70 may include a processor 72, a memory 74 having ROM and RAM, and a communications module 76 as described above. The finishing apparatus controller 70 is discussed in greater detail below. Though referred to herein as a single entities, the finishing module controller 60 and the finishing apparatus controller 70 may refer collectively to multiple control and processing devices across which the functionality of the finishing module 18 and the finishing apparatus 10 may be distributed.

Figure 3:
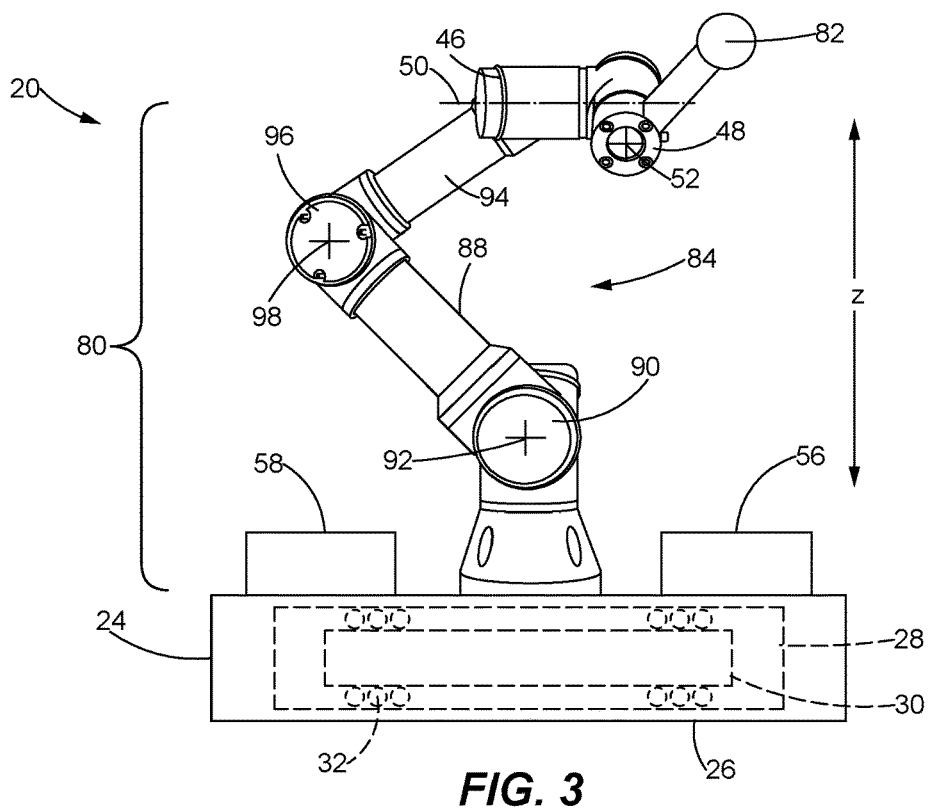
FIG. 3 is a side view of an alternative embodiment of a finishing module in accordance with present disclosure of the finishing apparatus of FIG. 1.

FIG. 3 illustrates the second embodiment of a finishing module 20 where similar components as previously discussed for the finishing module 18 are identified by the same reference numerals. The finishing module 20 has a generally similar configuration as the finishing module 18 including the module base 24 with the linear motor 28, an end effector positioning device 80 and a finishing operation end effector 82 in the form of a sensing end effector. The end effector positioning device 80 may be a robotic arm 84 mounted to the module base 24 by a mounting bracket 86. A lower arm 88 may be pivotally connected to the mounting bracket 86 by a first arm rotary actuator 90 for rotation of the lower arm 88 about a first arm rotational axis 92. An upper arm 94 may be pivotally connected to the lower arm 88 opposite the first arm rotary actuator 90 by a second arm rotary actuator 96 for rotation of the upper arm 94 relative to the lower arm 88 about a second arm rotational axis 98 that may be parallel to the first arm rotational axis 92.

The rotary actuators 46, 48 may be connected to the upper arm 94 and relative to each other in a similar manner as the connection in the end effector positioning device 34 as discussed above. Actuation of the rotary actuators 90, 96 can be coordinated by the finishing module controller 60 to extend and retract the arms 88, 94 to move the rotary actuators 46, 48 and the finishing operation end effector 82 in the Z-direction. The end effector positioning device 80 also allows for adjustment of the position of the finishing operation end effector 82 in either the X-direction or the Y-direction depending on the orientation of the finishing module 20. Similar to the discussion above, the rotary actuators 46, 48 provide two degrees of rotation of the finishing operation end effector 82 to orient the finishing operation end effector 82 relative to the surface of the workpiece.

The finishing operation end effector 82 in the illustrated embodiment may be a sensing end effector capable of sensing a property or properties of the surface. For example, the sensing end effector may be a distance sensor that is positioned to sense a distance to the surface of the workpiece. The sensed distance may be used by the finishing module controller 60 or the finishing apparatus controller 70 determine whether the platen 12 is too close to or too far from the surface to perform the required finishing operations such as painting or printing by appropriate medium dispensing end effectors. The sensed distance may also be communicated to other finishing modules 18, 20 to adjust their finishing operation end effectors 36, 82 to appropriate distances from the surface for performing their finishing operations. The sensing end effector could be other types of sensors such as a cleanliness probe for sensing the presence of oil, dirt or other contaminants on the surface that could adversely affect the quality of the finishing operations that will be performed on the surface. The sensing end effector could alternatively be a vision inspection probe that can evaluate the quality or accuracy of a finishing operation that was performed on the surface, such as evaluating the location of pixels after a printing operation and determining whether the pixels were printed in the correct locations. The finishing operation end effector 82 could be other appropriate types of sensing end effectors known in the art. Such sensing end effectors may not require the medium reservoir 56 described above, and it may be possible to omit the medium reservoir 56.

The planar platen 12 of the finishing apparatus 10 of FIG. 1 may be adequate for performing many of the finishing operations on many of the workpieces on which the operations are performed. In some situations, it may be difficult due the geometry of the surface of the workpiece to efficiently perform the finishing operations with the planar platen 12. For example, the curvature of a fuselage of an aircraft may only allow a portion of the planar platen 12 to be disposed in close enough proximity to the surface of the fuselage to perform a finishing operation such as painting. In such situations, it may be desirable to modify the geometry of the platen to be more complimentary to the shape of the workpiece.

Figure 4:
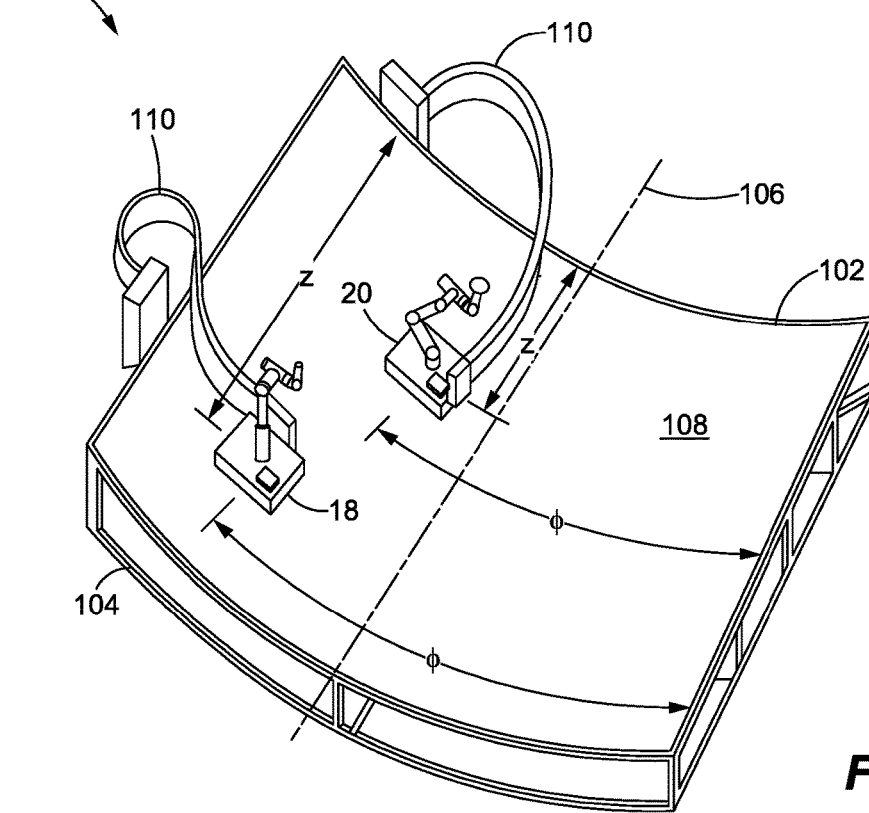
FIG. 4 is a perspective view of an alternative embodiment of a finishing apparatus in accordance with the present disclosure for performing finishing operations on surfaces of workpieces.

Referring to FIG. 4, an alternative embodiment of a finishing apparatus 100 having a curved platen 102 mounted on a mounting bracket 104 that conforms more closely to the shapes of workpieces upon which the finishing apparatus 100 will perform finishing operations. In the illustrated embodiment, the curved platen 102 is a hollow horizontal cylindrical segment having a constant radius of curvature R from a platen longitudinal axis 106. Locations on a platen surface 108 of the curved platen 102 may be identified using a cylindrical coordinate system. A radial distance ρ is a perpendicular distance from the platen longitudinal axis 106 to the point on the platen surface 108. The radial distance ρ is equal to the radius of curvature R for all points on the curved platen 102. An azimuth φ is an angle about the platen longitudinal axis 106 between a reference position, such as a corner of the curved platen 102, and the point on the platen surface 108. A height z is a distance along the platen longitudinal axis 106 from the reference position to the point on the platen surface 108. This convention may be used by the finishing apparatus controller 70 and/or the finishing module controllers 60 to control the movement of the finishing modules 18, 20 over the platen surface 108.

The finishing modules 18, 20 have generally the same configurations as described above, but with some modifications to adapt the finishing modules 18, 20 to the curved platen 102. The bottom surfaces 26 of the module bases 24 of the finishing modules 18, 20 may be curved instead of planar to correspond to the curvature of the platen surface 108. Also, though not required, the finishing modules 18, 20 may be more directly controlled by the finishing apparatus controller 70. The finishing modules 18, 20 may be more directly connected to the finishing apparatus 100 by tethers 110. The tethers 110 may contain wiring operatively connecting the finishing apparatus controller 70 to the various electrical components of the finishing modules 18, 20, including the windings 32 and the finishing operation end effectors 36, 82, for transmission of power and control signals. For medium dispensing end effectors, the tethers 110 may also have fluid conduits passing there through to fluidly connect medium reservoirs to the medium dispensing end effectors. With this arrangement, the finishing modules 18, 20 may not require some or all of the medium reservoir 56, the power source 58 and the finishing module controller 60, and such components may be omitted. While use of the tethers 110 may simplify and reduce components of the finishing modules 18, 20, the tethers 110 may place constraints on the finishing module 18, 20 moving over the platen surfaces 22, 108 to avoid engaging and entangling the tethers 110.

Returning to FIG. 1, one or more of the finishing modules 18, 20 can move over the platen surface 22 by actuating the linear motors 28 in the module bases 24. A bearing system of the finishing apparatus 10 may provide a gap between the platen surface 22 and the bottom surfaces 26 of the module bases 24 to allow the finishing modules 18, 20 to glide over the platen surface 22 with minimal resistance due to friction. In one embodiment, the bearing system may be an air bearing wherein a pressurized air source 120, such as a pump, provides pressurized air through a conduit 122 to the platen 12. The pressurized air is discharged through a plurality of orifices 124 through the platen 12 that may be evenly spaced across the platen surface 22. The discharged air creates a layer of air between the platen surface 22 and the bottom surfaces 26 of the finishing modules 18, 20 despite the attractive force of the permanent magnets 30 biasing the finishing modules 18, 20 toward the platen surface 22. However, the attractive force is sufficient to maintain the finishing modules 18, 20 in close proximity to the platen surface 22 even through a 360° rotation of the platen 12. The air gap created by the discharged air allows the finishing modules 18, 20 to glide over the platen surface 22 in the X-direction, the Y-direction, or in a combination thereof, without friction acting against the movement of the finishing modules 18, 20. The air bearing system may be implemented in a similar manner in the curved finishing apparatus 100 of FIG. 3.

In an alternative embodiment, the bearing system may be a roller bearing system allowing the finishing modules to roll over the platen surface 22. In the roller bearing system, roller bearings (not shown) may be installed in the bottom surfaces 26 of the module bases 24. The roller bearings partially extend below the bottom surfaces 26 and engage the platen surface 22 to create a constant air gap between the platen surface 22 and the bottom surfaces 26. The roller bearings will roll over the platen surface 22 with some amount of friction resisting the movement of the finishing modules 18, 20, but with less friction than would exist with surface-to-surface contact between the platen surface 22 and the bottom surfaces 26.

With the air gap established between the platen surface 22 and the bottom surfaces 26, the windings 32 of the linear motors 28 may be energized to move the finishing modules 18, 20. The magnetic flux generated by the windings 32 interacts with the permanent magnets 30 and the platen 12 to cause the finishing modules 18, 20 to glide over the platen surface 22 in the X-direction, the Y-direction, or in a combination thereof. The flow of current through the windings 32 may be controlled the finishing module controller 60 and/or the finishing apparatus controller 70 to move the finishing modules 18, 20 along predetermined paths. As the finishing modules 18, 20 move along the paths, the end effector positioning devices 34, 80 and the rotary actuators 46, 48 may be operated to change the position and orientation of the finishing operation end effectors 36, 82 as necessary to follow the contours of a surface of a workpiece. At the same time, the finishing operation end effectors 36, 82 may be operated to perform the corresponding finishing operations on the surface of the workpiece.

Figure 5:
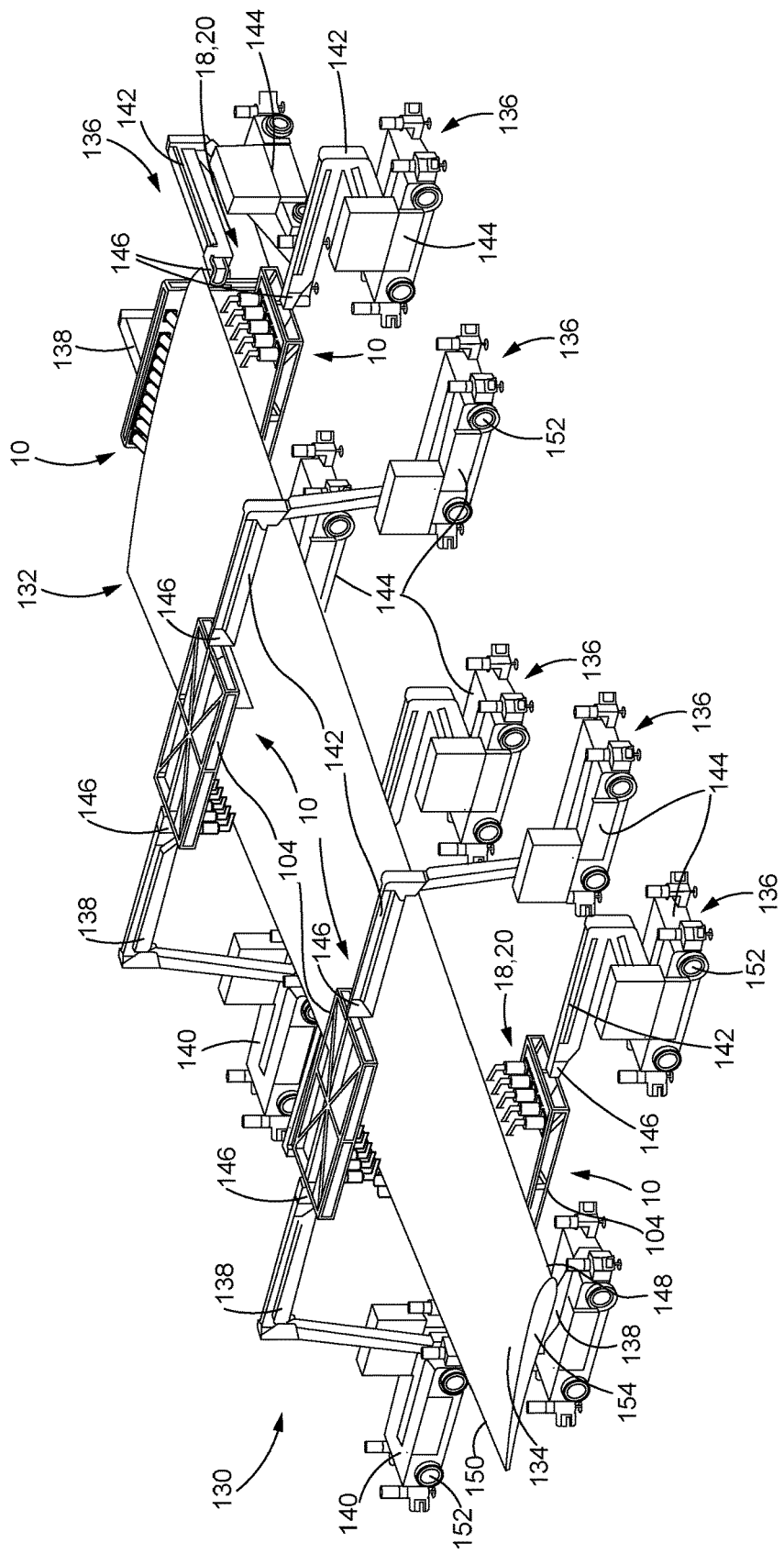
FIG. 5 is a perspective view of an embodiment of a finishing station in accordance with the present disclosure implementing a plurality of the finishing apparatus of FIG. 1.

FIG. 5 illustrates an example of the finishing station 130 at which a plurality of the finishing apparatus 10 may simultaneously perform finishing operations on a workpiece 132 in the form of an aircraft wing. The finishing station 130 may be particularly applicable for performing finishing operations on workpieces 132 having generally flat surfaces 134 or surfaces having relatively large radii of curvature so that a majority of the platen surface 22 of the planar platen 12 may positioned in close enough proximity to the workpiece 132 for the finishing modules 18, 20 to perform the finishing operations. The finishing apparatus 10 may be mounted on and carried by corresponding positioning apparatus 136 that may be capable of moving the finishing apparatus 10 into position proximate the workpiece 132 and around the finishing station 130.

In the illustrated embodiment, each positioning apparatus 136 is a movable gantry system having a first lift arm 138 connecting an end of the platen mounting bracket 14 to a movable cart, such as a first omnidirectional cart 140 (also known as an omni-cart 140), and a second lift arm 142 connecting the opposite end of the platen mounting bracket 14 to a second omnidirectional cart 144. The lift arms 138, 142 may be articulated so that each can be raised, lowered, extended or retracted independently of the other. Connections 146 of the lift arms 138, 142 to the platen mounting bracket 14 may provide multiple degrees of freedom to facilitate orienting the finishing apparatus 10 to any desired position. The finishing apparatus 10 may be rotatable by an appropriate rotary actuator (not shown) through 360° of rotation about an axis extending through the connections 146 to the lift arms 138, 142. This rotation may allow the finishing apparatus 10 to be disposed above, below or adjacent to the workpiece 132 with the platen surface 22 facing a corresponding portion of the surface 134 of the workpiece 132.

The connections 146 may allow one or more additional rotational degrees of freedom allowing the finishing apparatus 10 to pivot relative to the lift arms 138, 142. The additional rotational freedom may provide further adjustment of the orientation of the finishing apparatus 10 to match the contour of the surface 134 of the workpiece 132. For example, the top side of the surface 134 of the aircraft wing in FIG. 5 slopes downward as the surface 134 extends rearward from a leading edge 148 toward a trailing edge 150. The finishing apparatus 10 disposed above the surface 134 as shown in FIG. 5 are farther from the surface 134 proximate the trailing edge 150 than proximate the middle of the surface 134. The connections 146 allow the first lift arm 138 to lower the corresponding end of finishing apparatus 10 toward the trailing edge 150 while the second lift arm 142 maintains its position as the finishing apparatus 10 rotates downward. The connections 146 further facilitate orientation of the finishing apparatus 10 as shown with the rightmost positioning apparatus 136 in FIG. 5 to orient the finishing apparatus 10 facing a side of the workpiece.

The omni-carts 140, 144 facilitate movement of the entire positioning apparatus 136 and the finishing apparatus 10 relative to the workpiece 132 and around the finishing station 130. As shown in FIG. 5, the wheels 152 of the omni-carts 140, 144 are turned so that the omni-carts 140, 144 can move toward and away from the workpiece 132. This limited range of movement may be sufficient where the workpiece 132 is moved into and out of position in the finishing station 130, and in particular above or below the finishing apparatus 10. In other embodiments, the positioning apparatus 136 may be provided with a great range of motion by configuring all four wheels 152 of the omni-carts 140, 144 to rotate 90° about vertical axes from the illustrated positions. Once rotated, the omni-carts 140, 144 can move the positioning apparatus 136 and the finishing apparatus 10 perpendicular to the direction of movement shown in FIG. 5. This may allow the workpiece 132 to remain in place as the positioning apparatus 136 reposition the finishing apparatus 10 along the length of the workpiece 132 to perform the finishing operations at multiple locations along the workpiece 132. The positioning apparatus 136 can also drive past a wing tip 154 and take the finishing apparatus 10 out of proximity to the workpiece 132 when the finishing operations are completed.

With the increased mobility afforded by the positioning apparatus 136 as described, the finishing station 130 is not required to be restricted to a defined location within a facility. It may be possible to bring the finishing station 130 to the workpiece 132 and perform the finishing operations at that location, especially where the workpiece 132 is large and it may be impractical to move around the facility. Of course, in alternative implementations, the finishing station 130 may be established at a fixed location within a facility. It is also contemplated that the lift arms 138, 142 may be able to adequately position the finishing apparatus 10 without the added mobility provide by the omni-carts 140, 144. In such implementations, the omni-carts 140, 144 may be omitted and the lift arms 138, 142 may be mounted on a floor, platform or other permanent structure in a manner that will support the finishing apparatus 10 and the lift arms 138, 142 as the finishing operations are performed.

Figure 6:
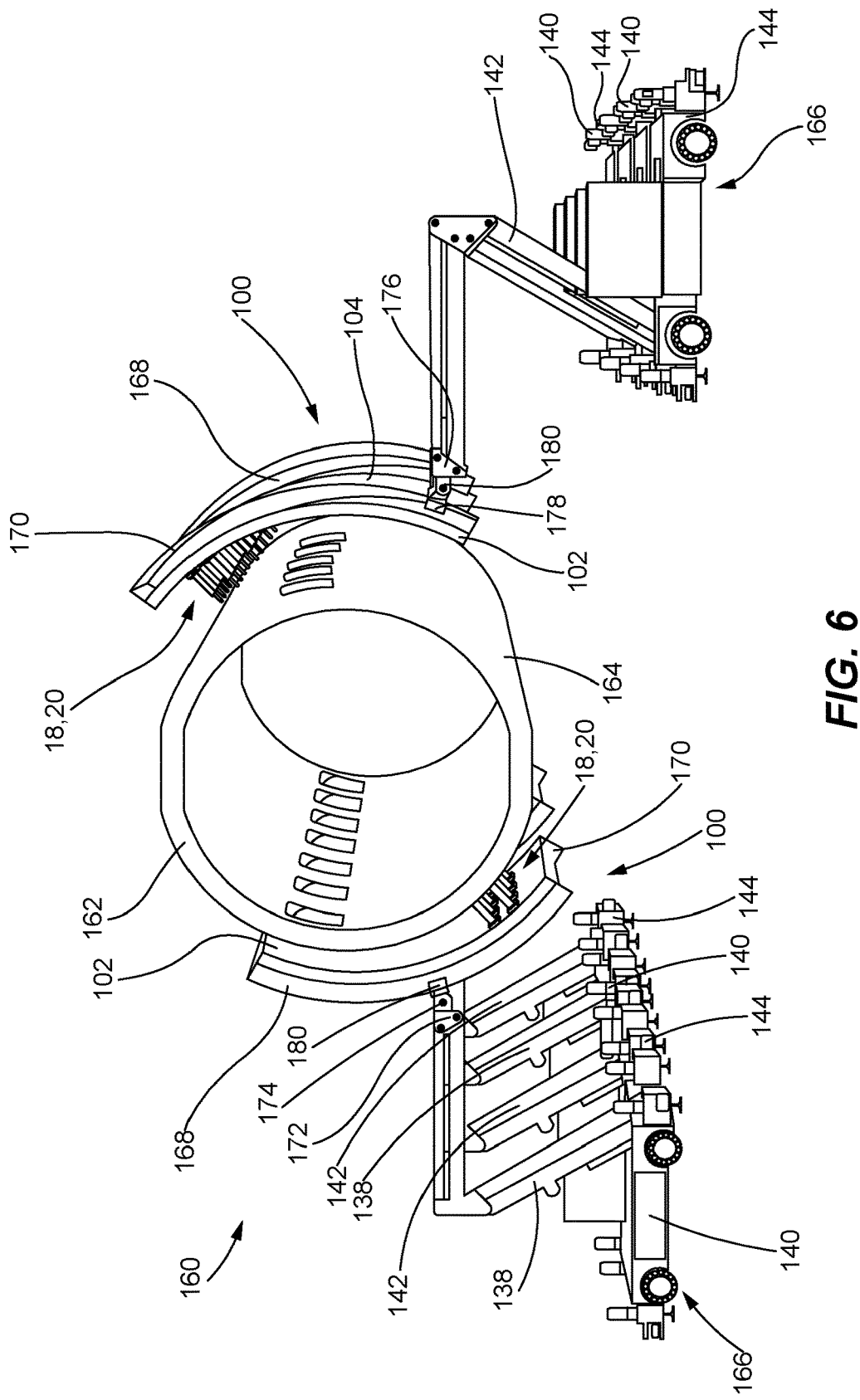
FIG. 6 is a perspective view of an alternative embodiment of a finishing station in accordance with the present disclosure implementing a plurality of the finishing apparatus of FIG. 4.

FIG. 6 illustrates an alternative embodiment of a finishing station 160 where finishing operations are performed using the finishing apparatus 100 with the curved platen 102 of FIG. 4. The finishing station 160 may have particular application for a workpiece 162 having a surface 164 with a high degree of curvature such as the airplane fuselage as illustrated. The finishing station 160 may have positioning apparatus 166 for the finishing apparatus 100 having lift arms 138, 142 and omni-carts 140, 144 that are substantially as described above with reference to the finishing station 130 of FIG. 5. However, the positioning apparatus 166 differs from the positioning apparatus 136 in the connection of the positioning apparatus 166 to the mounting bracket 104 of the finishing apparatus 100.

The mounting bracket 104 may include a first positioning rail 168 and a second positioning rail 170. The positioning rails 168, 170 have arcuate shapes that are complimentary to the concave outer surface of the curved platen 102 and have radii of curvature that are centered on the platen longitudinal axis 106 (FIG. 4). The first positioning rail 168 is received at a first connection 172 of the first lift arm 138 by a first guide bracket 174 and the second positioning rail 170 is received at a second connection 176 of the second lift arm 142 by a second guide bracket 178. Appropriate actuators (not shown) may operate to slide the positioning rails 168, 170 in the guide brackets 174, 178 to adjust the circumferential position of the finishing apparatus 100 relative to the workpiece 162. As shown in FIG. 6, the guide brackets 174, 178 retain the positioning rails 168, 170 of the finishing apparatus 100 on the left side of the figure at approximately a midpoint along the circumferential length of the positioning rails 168, 170 and the curved platen 102. For the finishing apparatus 100 on the right, the guide brackets 174, 178 retain the positioning rails 168, 170 proximate a lower edge of the curved platen 102. Consequently, while the lift arms 138, 142 and the omni-carts 140, 144 are in similar positions relative to the workpiece 162, the finishing apparatus 100 on the right is positioned higher on the surface 164 than the finishing apparatus 100 on the left.

The connections 172, 176 may each have a pivot shaft 180 with a rotational axis that is parallel to the platen longitudinal axis 106. The guide brackets 174, 178, and consequently the finishing apparatus 100, may be rotated about the pivot shaft 180 by an appropriate actuator (not shown). This additional degree of freedom of movement of the finishing apparatus 100 may further facilitate orienting the finishing apparatus 100 relative to the surface 164 of the workpiece 162. As with the finishing station 130, the lift arms 138, 142 may be able to adequately position the finishing apparatus 100 without the added mobility provide by the omni-carts 140, 144, and the omni-carts 140, 144 may be omitted and the lift arms 138, 142 may be mounted on a permanent structure. It is also contemplated that the finishing stations 130, 160 may be combined into a single finishing station providing both finishing apparatus 10, 100 so that the combined finishing station could perform finishing operations efficiently on workpieces having diverse surface contours.

Figure 7:
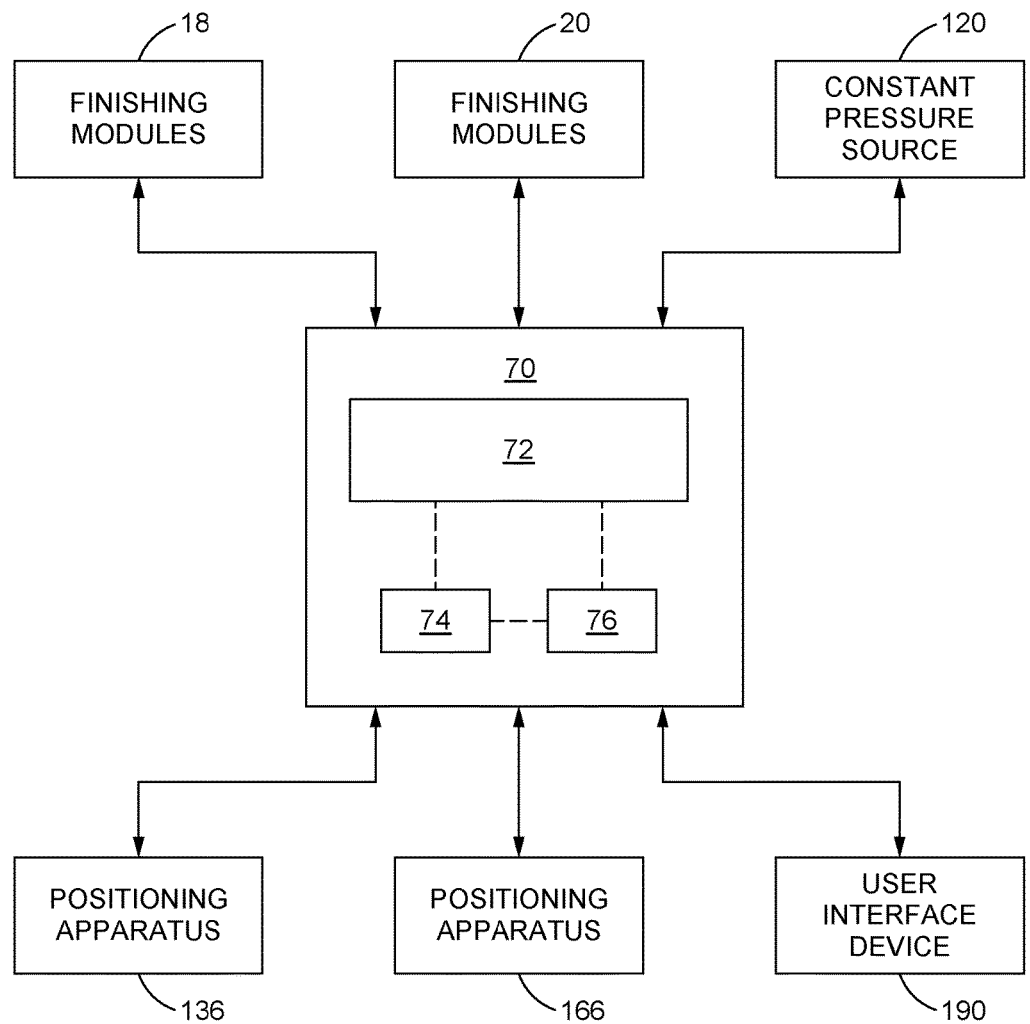
FIG. 7 is a schematic illustration of control elements of the finishing stations of FIGS. 5 and 6.

In one embodiment, the overall operations of the finishing stations 130, 160 may be controlled and coordinated centrally at the finishing apparatus controller 70. Referring to FIG. 7, the finishing apparatus controller 70 may be communicatively linked to the other functional components of the finishing stations 130, 160 directly or wirelessly by the communications module 76. For example, the finishing apparatus controller 70 may communicate with the finishing modules 18, 20 with instruction regarding paths to use in traversing the platen surfaces 22, 108, and where to position and when to actuate the finishing operation end effectors 36, 82 to perform their finishing operations. The finishing modules 18, 20 may communicate information to the finishing apparatus controller 70 such as sensor signals containing information from the sensing end effectors, medium levels at the medium reservoir 56, and power levels at the power source 58. The finishing apparatus controller 70 may also communicate with the pressurized air source 120 regarding when to begin and when to cease outputting pressurized air to the platens 12, 102.

To the extent that the operations of the positioning apparatus 136, 166 are automated, the finishing apparatus controller 70 may transmit control signals to the control components of the positioning apparatus 136, 166 to move the finishing apparatus 10, 100 into position proximate one of the workpieces 132, 162. The positioning apparatus 136, 166 may execute the commands and respond by transmitting messages indicating whether the finishing apparatus 10, 100 are in position. When the finishing processes are complete, the finishing apparatus controller 70 may transmit further control signals to the positioning apparatus 136, 166 to withdraw the finishing apparatus 10, 100 from the workpieces 132, 162 so the workpieces 132, 162 can be moved to the next processing station, or the finishing stations 130, 160 can be relocated to the next workpieces 132, 162 on which finishing operations will be performed.

The finishing stations 130, 160 may further include a user interface device 190 that may allow operators at the finishing stations 130, 160 to communicate with the finishing apparatus controller 70. The operators may enter information at the user interface device 190 that will be transmitted and stored at the finishing apparatus controller 70. Such information may include multi-finishing module workpiece finishing routines, travel paths for the finishing modules 18, 20 to traverse while performing their finishing operations, portions of the travel paths during which the finishing operation end effectors 36, 82 will be actuated to perform their finishing operations, geometric information for the surfaces 134, 164 of the workpieces 132, 162, finishing apparatus positing information to be used by the positioning apparatus 136, 166 to position and orient the finishing apparatus 10, 100 proximate the surfaces 134, 164 of the workpieces 132, 162, and the like. The information may be input manually by the operator, or the user interface device 190 may include input ports for connecting peripheral devices such as storage devices or portable computing devices, or establishing network connections to local area networks (LANs), wide area networks (WANs) or other remote networks that may download the information.

The transmitted information may be stored at the finishing apparatus controller 70 and transmitted in real time to the finishing modules 18, 20, the pressurized air source 120 and the positioning apparatus 136, 166 as the finishing operations are being performed. Alternatively, the information may be distributed from the finishing apparatus controller 70 to the other control components as the information is received. Such distribution of information may allow the devices to perform their functions independently and without relying on the finishing apparatus controller 70 or another centralized control device to coordinate the operations being performed at the finishing stations 130, 160.

The user interface device 190 may also receive data from the finishing apparatus controller 70 relating to the execution of the finishing operations at the finishing stations 130, 160. The execution data may include information such as finishing operation status information generated by the various components during the finishing operations and indicative of progress of the finishing operations as they are occurring, finishing operation error or defect information indicating the occurrence of events such as errors in performing the finishing operations, detected quality exceptions and the like. The user interface device 190 may display the status information at a display device, store the information, transmit the information to other devices or systems, or use the data for any other appropriate processing and evaluation of the finishing operations.

The arrangement of components and the exchange of information described in relation to FIG. 7 are exemplary only. The execution and control of the finishing operations performed at the finishing stations 130, 160 may be centralized, distributed or combined in hybrid control structures between the control elements discussed herein and other control elements as necessary to efficiently perform the finishing operations. Such alternative control strategies are contemplated as having use in methods and apparatus in accordance with the present disclosure.

INDUSTRIAL APPLICABILITY

Figure 8:
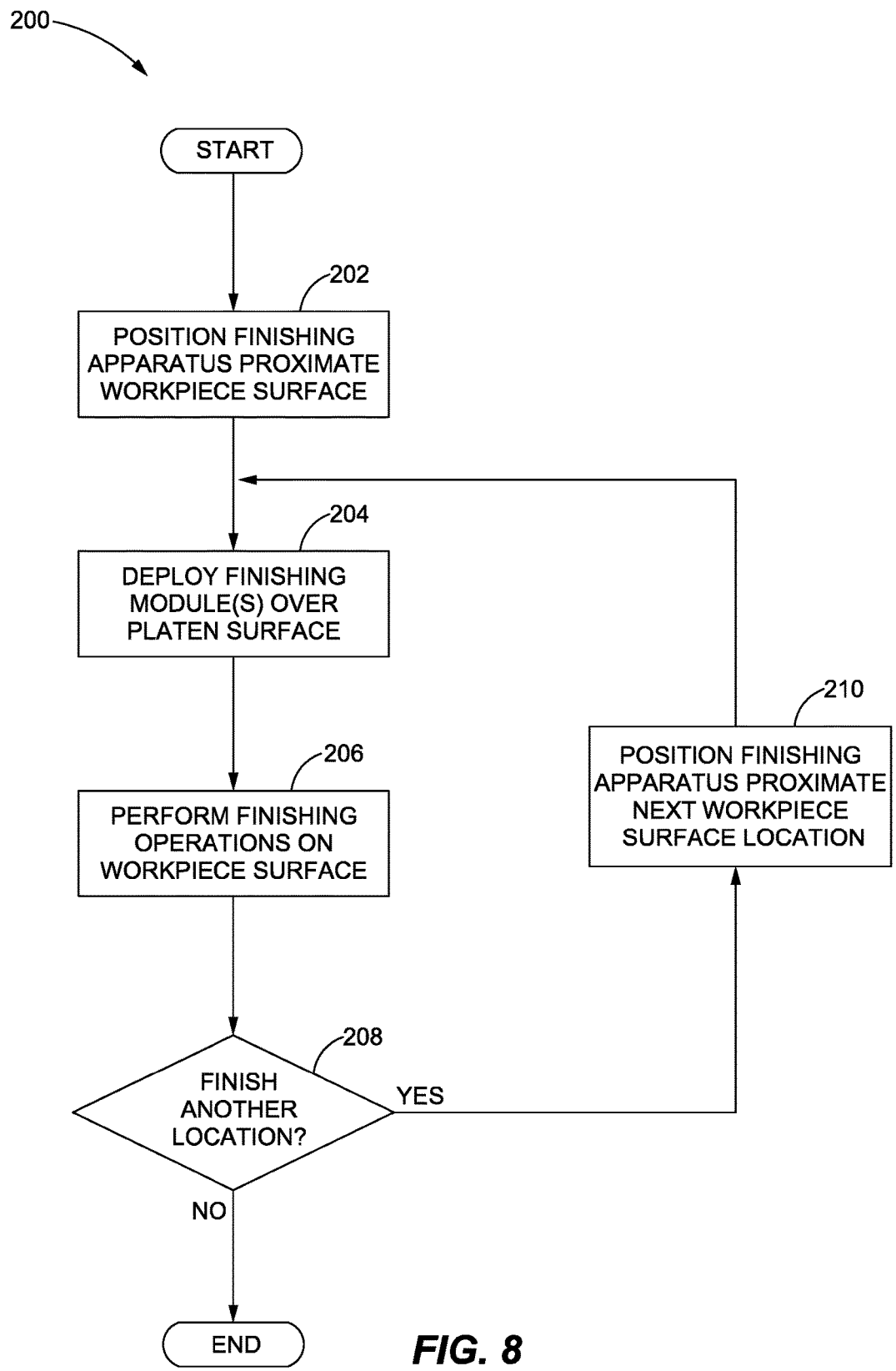
FIG. 8 is a flow diagram of an automated finishing operation routine in accordance with the present disclosure that may be performed by the finishing apparatus of FIGS. 1 and 4.

The operation of the components described above is illustrated in FIG. 8 that presents an exemplary automated finishing operation routine 200 for performing a finishing operation or finishing operations on a surface of a workpiece. The finishing station 130 with the finishing apparatus 10 performing finishing operations on the surface 134 of the workpiece 132 are referenced in the following discussion of the routine 200, however the routine 200 may be implemented at the finishing station 160 with the finishing apparatus 100, or a hybrid finishing station having both types of finishing apparatus 10, 100. Such variations and implementations are contemplated herein.

The automated finishing operation routine 200 may begin at a block 202 where the finishing apparatus 10 is positioned proximate the surface 134 of the workpiece 132. As discussed above, the finishing apparatus controller 70 or a controller of the positioning apparatus 136 may store geometric information for the workpiece 132 and other appropriate information for operating the positioning apparatus 136 to position the finishing apparatus 10 at a predetermined location on the surface 134 of the workpiece 132. At the block 202, the information is retrieved and used by the positioning apparatus 136 move to the workpiece 132 if necessary, and position and orient the finishing apparatus 10 proximate the location on the surface 134 with the platen surface 22 facing the surface 134. As discussed further below, positioning the finishing apparatus 10 may be an iterative process where the position of the finishing apparatus 10 is evaluated to determine if the finishing modules 18, 20 can perform respective finishing operations. If the finishing apparatus 10 is not in the proper position, the position and/or orientation is adjusted based on the information from the evaluation until the finishing operations can be performed on the surface 134.

Once the finishing apparatus 10 is properly positioned, control may pass to a block 204 where at least one finishing module 18, 20 is deployed over the platen surface 22. The deployment may include discharging air through the plurality of orifices 124 to create an air gap between the platen surface 22 and the finishing modules 18, 20 as discussed above for the embodiment of FIG. 1, and controlling the magnetic flux created by the finishing modules 18, 20 to move the finishing modules 18, 20 through predetermined paths over the platen surface 22 as further described above. Path information stored at the finishing apparatus controller 70 and/or the finishing module controllers 60 may define the route the finishing modules 18, 20 traverse over the platen surface 22 and past the surface 134. The path information is used by one of the controllers 60, 70 to cause current to be transmitted to the windings 32 in the linear motor 28 to begin moving the finishing module 18, 20 along the path.

In one exemplary implementation, one of the finishing modules 18 with a finishing operation end effector 36 that is a medium dispensing end effector will paint the surface 134 of the workpiece 132, and the finishing module 18 may follow a serpentine path and be deployed to at a corner of the platen 12 to begin traversing the path. In other embodiments, multiple finishing modules 18 may paint the surface 134, with each finishing modules 18 traveling along a different path. The paths may be integrated so that the entire surface 134 is painted when the finishing modules 18 reach the ends of their respective paths. Further embodiments may incorporate the finishing modules 20 having finishing operation end effectors 82 in the form of sensing end effectors. A first finishing module 20 may have a finishing operation end effector 82 configured to detect the presence or absence of contaminants that can affect the paint job performed by the finishing module(s) 18. The first finishing module 20 may be deployed over the path of the finishing module 18 or an alternate surface condition inspection path before the finishing module 18. A second finishing module 20 may have a finishing operation end effector 82 with a vision system that evaluates the quality of the paint job applied to the surface 134 by the finishing module 18. Other combinations of finishing modules 18, 20 and finishing operations are contemplated, and in each case the finishing modules 18, 20 are deployed to the starting positions of their respective paths.

With the finishing module(s) 18, 20 deployed along their respective travel paths, control may pass to a block 206 where the finishing module(s) 18, 20 perform respective finishing operations. Control signals may be transmitted to the finishing operation end effectors 36 causing the finishing operation end effectors 36 to apply the medium, i.e., paint, printer ink and the like, onto the surface 134 as the finishing modules 18 travel along respective paths. Control signals transmitted to the finishing operation end effectors 82 will cause the finishing operation end effectors 82 to perform the finishing operation operations as the finishing modules 20 travel along respective paths. The operation of the movable omni-carts 140, 144 may be controlled while the finishing operation end effectors 82 are performing the automated finishing operations. The finishing operations will continue being performed according to the instructions in the control signals until the finishing modules 18, 20 reach the ends of the paths.

When all of the finishing operations have been performed by the finishing modules 18, 20 at the location on the surface 134, control may pass to a block 208 where the finishing apparatus controller 70 or the finishing module controllers 60 determine whether finishing apparatus 10 is directed to perform finishing operations at another location on the surface 134 of the workpiece 132. If the finishing apparatus 10 is instructed to another location, control may pass to a block 210 where the finishing apparatus 10 is repositioned proximate the next location of the surface 134 of the workpiece 132. The process for repositioning the finishing apparatus 10 may be similar to that described above in relation to the block 202 for positioning the finishing apparatus 10 at the first location on the surface 134. If the finishing apparatus controller 70 or the finishing module controllers 60 determine that the finishing apparatus 10 has completed performing finishing operations of the surface 134 at the block 208, the routine 200 may terminate, after which the routine 200 may begin execution again when another workpiece 132 is to be finished at the finishing station 130.

Figure 9:
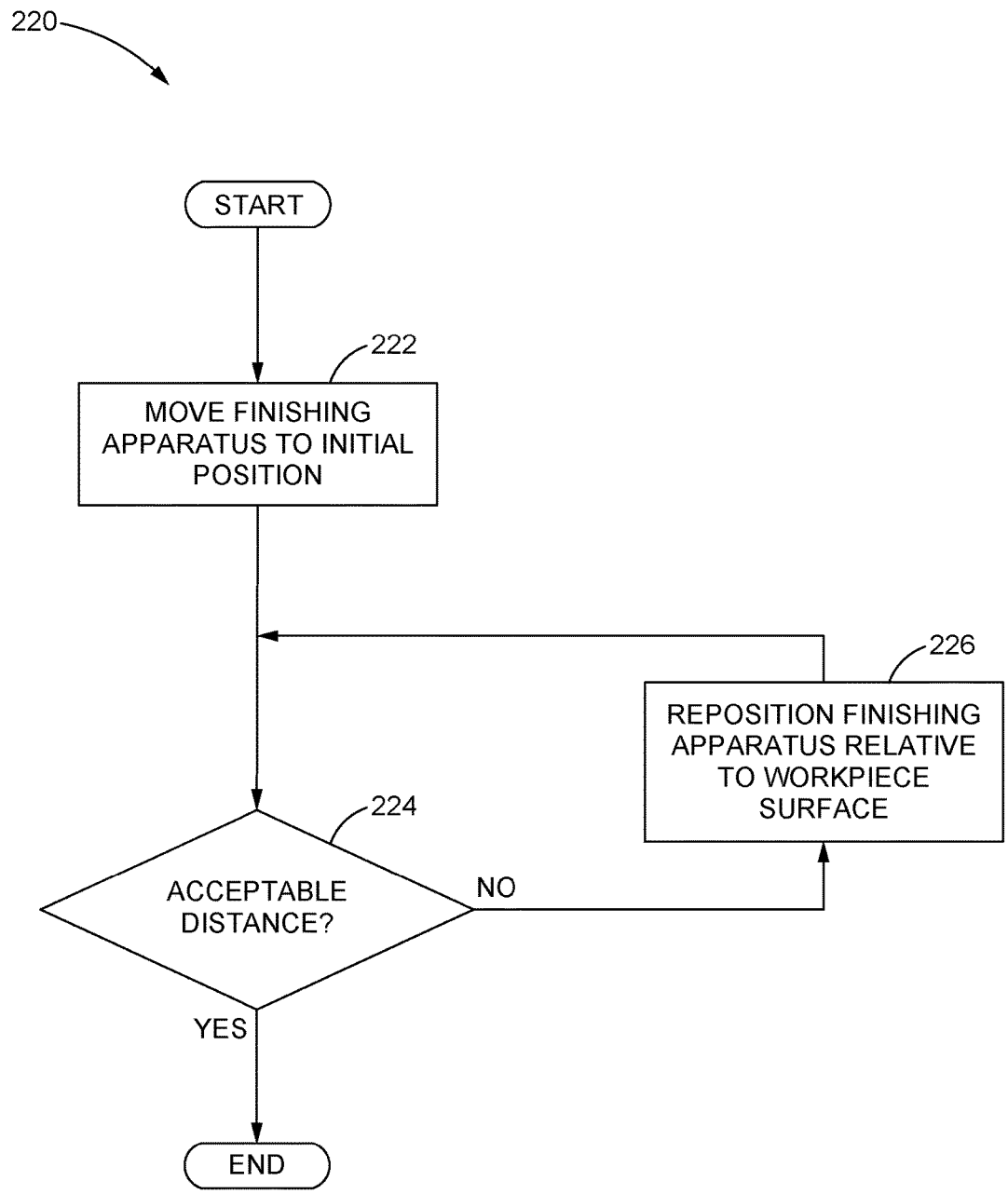
FIG. 9 is a flow diagram of a finishing apparatus positioning routine in accordance with the present disclosure that may be performed within the routine of FIG. 8.

As discussed above, the process for positioning the finishing apparatus 10 performed at blocks 202 and 210 of the routine 200 may be iterative processes. An embodiment of a finishing apparatus positioning routine 220 is illustrated in FIG. 9. The routine 200 may be executed within the block 202 of the automated finishing operation routine 200 of FIG. 8. The routine 220 may begin at a block 222 where the finishing apparatus 10 is moved to an initial position proximate the surface 134 of the workpiece 132. The geometric information and other positioning information stored at the finishing apparatus controller 70 or the controller of the positioning apparatus 136 may be used to position the finishing apparatus 10 at a predetermined initial position proximate the location on the surface 134 of the workpiece 132 with the platen surface 22 facing the surface 134.

After the finishing apparatus 10 is moved to the initial position, control may pass to a block 224 where the finishing apparatus controller 70 or a finishing module controller 60 determines whether the finishing apparatus 10 is positioned within an acceptable range of distances from the surface 134. If the finishing apparatus 10 is too close to the surface 134, the finishing modules 18, 20 could come into contact with the surface 134 and cause damage to the workpiece 132 or mar or inadvertently alter the finish being applied to the surface 134. If the finishing apparatus 10 is too far from the surface 134, the finishing modules 18, 20 may not be close enough to the surface 134 to perform the finishing operations with the required quality. The distance to the surface 134 may be determined by deploying one or more of the finishing modules 20 with finishing operation end effectors 82 in the form of distance sensors. The finishing modules 20 may be caused to traverse a predetermined distance inspection path and sense the distance to the surface 134 at multiple points along the path. The distance sensors may transmit distance sensor signals to the controllers 60, 70 containing values corresponding to the distances to the surface 134 at the various points along the distance inspection path.

If values from the distance sensor signals are less than a predetermined minimum surface distance or greater than a maximum surface distance, all or a portion of the finishing apparatus 10 is not disposed at an acceptable distance from the surface 134. In this condition, control may pass to a block 226 where the finishing apparatus 10 is repositioned relative to the surface 134 based on the values in the distance sensor signals. If the entire finishing apparatus 10 is too close to or too far from the surface 134, the positioning apparatus 136 will move the finishing apparatus 10 closer to or away from the surface 134 as dictated by the distance sensor signal values by a distance that should place the finishing apparatus 10 within the range of acceptable surface distances. Where portions of the finishing apparatus 10 are too close to the surface 134 and other portions are within the surface distance range, the positioning apparatus 136 may be controlled to rotate the close portions away from the surface 134 by an amount that should move the portion within the acceptable distance range between maximum and minimum surface distances. Conversely, portions of the finishing apparatus 10 that are too far from the surface 134 may be rotated toward the surface 134 by the positioning apparatus 136 by an amount that should move the portion within the acceptable distance range between maximum and minimum surface distances. After the position adjustment of the finishing apparatus 10, control may pass back to the block 224 to evaluate whether the finishing apparatus 10 in the readjusted position within the range of acceptable distances.

If the values from the distance sensor signals are greater than the predetermined minimum surface distance and less than the maximum surface distance, the finishing apparatus 10 is disposed at an acceptable distance from the surface 134. In this condition, the finishing apparatus 10 is properly positioned relative to the surface 134. With the finishing apparatus 10 properly positioned, the routine 220 may terminate until the finishing apparatus 10 is again positioned proximate a surface 134 of a workpiece 132.

Figure 10:
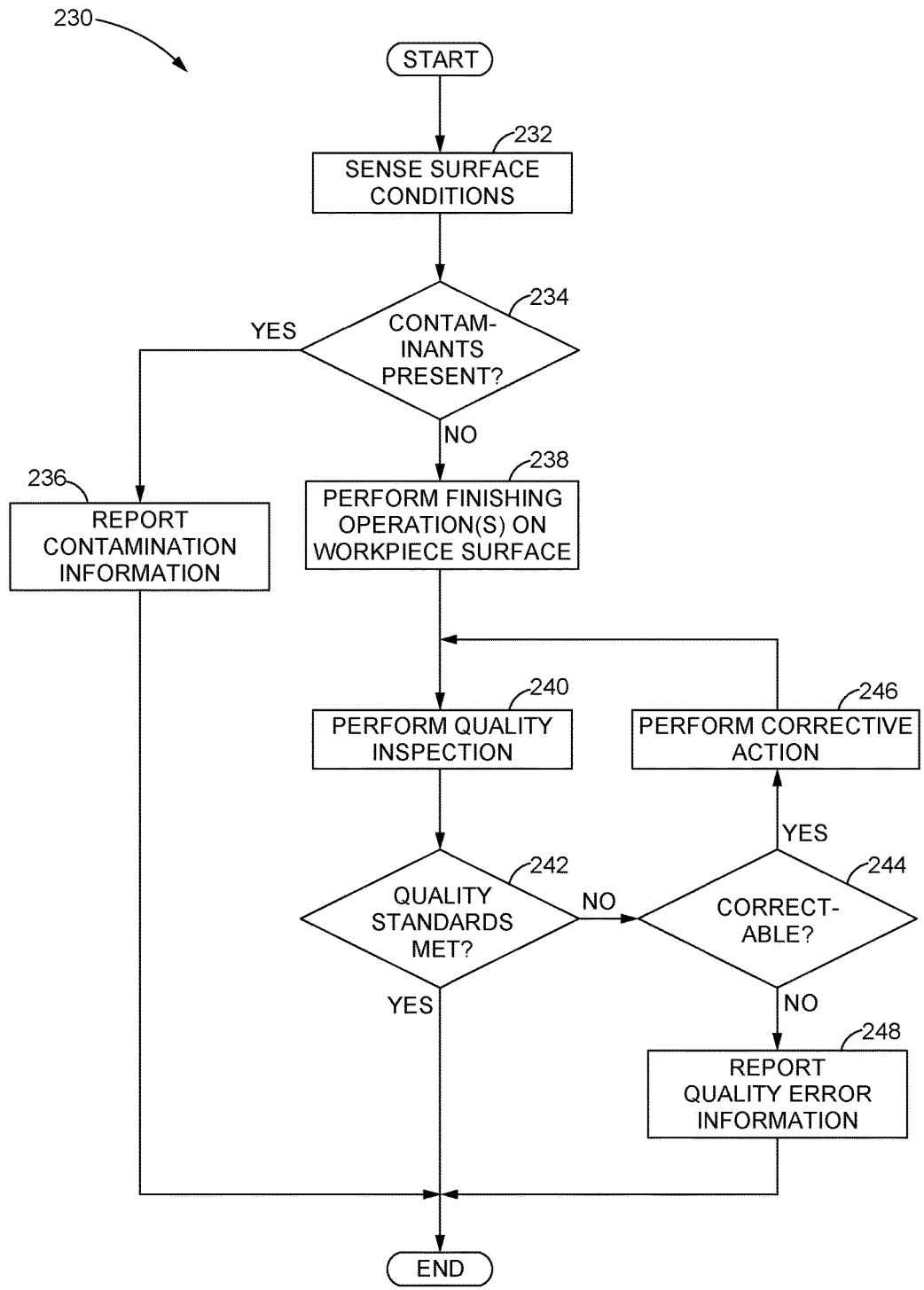
FIG. 10 is a flow diagram of a finishing apparatus performance routine in accordance with the present disclosure that may be performed within the routine of FIG. 8.

FIG. 10 illustrates a finishing operation performance routine 230 that may be executed within the block 206 of the routine 200. In the present example, the routine 230 contemplates printing lettering or a multi-color design on the surface 134 of the workpiece 132 using one or more finishing modules 18 having finishing operation end effectors 36 in the form of print head end effectors. The routine 230 may include surface quality checks before and after the printing operations are performed on the surface 134. The routine 230 may begin at a block 232 where surface conditions of the surface 134 are sensed to determine whether contaminants or other conditions are present that may affect the quality of the finish applied to the surface 134. Similar to the discussion above, one or more finishing modules 20 having finishing operation end effectors 82 in the form of a cleanliness probe may be deployed along predetermined surface condition inspection paths. While traversing the inspection paths, the cleanliness probe may detect the presence or absence of contaminants, such as dust, oil or adhesives, at multiple points on the surface 134 along the inspection path.

The cleanliness probe may transmit cleanliness sensor signals to the controllers 60, 70 as the finishing module 20 traverses the path or in a batch after the finishing module 20 completes the inspection path. Control may pass to a block 234 where the controllers 60, 70 evaluate the cleanliness sensor signals to determine whether contaminants are present on the surface 134. If contaminants are detected, control may pass to block 236 to report information regarding the contamination conditions. The contamination condition information may be transmitted to the user interface device 190 or other appropriate device or system to trigger the performance of maintenance or other preparation operations that may be required to place the surface 134 in condition for painting. After the reporting is performed, the routine 230 may terminate until contamination condition is corrected.

In alternative embodiments of the routine 230 and the finishing apparatus 10, one or more of the finishing modules 18, 20 may be equipped with finishing operation end effectors 36, 82 that can sand, scrape, grind, brush, sweep or otherwise operate on the surface 134 to remove the contaminants. In such embodiments, the controllers 60, 70 maybe configured to deploy the finishing modules 18, 20 that can remove the contaminant(s) to the contaminated location(s) in response to detecting the contamination. After the contaminant(s) are removed by the finishing modules 18, 20, control may pass back to the block 232 to re-inspect the surface 134 to confirm that the contaminant(s) have been removed.

If contaminants are not detected on the surface 134 at the block 234, control may pass to block 238 to proceed with performing the finishing operations on the surface 134. As discussed earlier with reference to the finishing operations in the routine 200, the printing may be performed by a single finishing module 18 traversing a path covering the entire portion of the surface 134 to be printed upon. For example, the finishing operation end effector 36, 82 applies one of paint and printer ink onto the surface 134, 164 of the workpiece 132, 162. In other embodiments, multiple finishing modules 18 may print on the surface 134, with each finishing modules 18 traveling along a different path. The paths may be integrated so that the entire portion of the surface 134 is printed upon when the finishing modules 18 reach the ends of their respective paths.

After the finishing operations are performed, control may pass to a block 240 where quality of the printing applied to the surface 134 may be inspected. One or more finishing modules 20 having finishing operation end effectors 82 in the form of vision sensors may be deployed along predetermined quality inspection paths. While traversing the quality inspection paths, the vision sensors may sense the positions of ink pixels at locations on the surface 134 along the path. The finishing module controller 60 may be programmed with the positions of the pixels in the lettering or design so that the actual pixel positions on the surface 134 can be compared to the specified positions. If the actual pixel positions do not match the specified positions, a printing quality standard may not have been met. Position errors may have to outside a prescribed printing tolerance to be determined to not meet the quality standards for the finish on the surface 134.

The vision sensors may transmit vision sensor signals to the controllers 60, 70 as the finishing module 20 traverses the quality inspection path or in a batch after the finishing module 20 completes the inspection path. Control may pass to a block 242 where the controllers 60, 70 evaluate the vision sensor signals to determine whether the printing on the surface meets the quality standards. If position errors are outside the prescribed printing tolerance, control may pass to block 244 where the controllers 60, 70 may evaluate whether the finishing apparatus 10 can correct the printing error. Some printing errors may be correctable by redeploying the finishing probe 18 to repaint the location with the printing error. Other printing errors may be require removal of the printing before the location can be reprinted. If the finishing apparatus 10 has finishing modules 18, 20 that can perform the necessary preparations such as sanding, the preparations may be performed and the location can be reprinted. If the printing error is found to be correctable at the block 244, control may pass to a block 246 where the controllers 60, 70 cause the appropriate finishing modules 18, 20 to deploy to the location and perform the corrective action on the surface 134.

If the finishing apparatus cannot perform the corrective action, control may pass to a block 248 to report information regarding the print quality error. The print quality error information may be transmitted to the user interface device 190 or other appropriate device or system to trigger the performance of the necessary corrective action that may be required to place the surface 134 in condition for reprinting. After the reporting is performed, the routine 230 may terminate until surface is prepared for reprinting.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A finishing apparatus for performing an automated finishing operation on a surface of a workpiece, the finishing apparatus comprising:
   a platen fabricated from a magnetic material and having a platen surface; and
   a finishing module disposed on the platen surface and having a finishing operation end effector, wherein the finishing module generates a magnetic field that biases the finishing module toward the platen, and is operable to generate a magnetic flux to control movement of the finishing module over the platen surface to perform the automated finishing operation on the surface of the workpiece.

2. The finishing apparatus in accordance with claim 1, wherein the platen is one of a flat platen and a curved platen.

3. The finishing apparatus in accordance with claim 1, comprising a mounting bracket to which the platen is coupled, wherein the mounting bracket couples the platen to a positioning apparatus that positions the finishing apparatus proximate the surface of the workpiece.

4. The finishing apparatus in accordance with claim 1, wherein the finishing module comprises a base and an end effector positioning device connecting the finishing operation end effector to the base, wherein the end effector positioning device is operable to change a position and an orientation of the finishing operation end effector relative to the surface of the workpiece.

5. The finishing apparatus in accordance with claim 1, wherein the finishing operation end effector applies one of paint and printer ink to the surface of the workpiece.

6. The finishing apparatus in accordance with claim 1, comprising a pressurized air source in fluid communication with the platen, wherein pressurized air from the pressurized air source is discharged through a plurality of orifices through the platen surface to create an air gap between the platen surface and the finishing module.

7. The finishing apparatus in accordance with claim 1, wherein the finishing module comprises a finishing module controller configured to control the magnetic flux to move the finishing module over the platen surface through a predetermined path.

8. A method of performing an automated finishing operation on a surface of a workpiece, the method implemented using a finishing apparatus having a platen fabricated from a magnetic material and having a platen surface, and a finishing module having a finishing operation end effector and disposed on the platen surface, wherein the finishing module generates a magnetic field biasing the finishing module toward the platen surface, the method comprising:
   deploying the finishing module over the platen surface using a magnetic flux generated by the finishing module; and
   performing, using the finishing operation end effector, the automated finishing operation.

9. The method in accordance with claim 8, the method further comprising:
   positioning the finishing apparatus proximate the surface of the workpiece; and
   performing the automated finishing operation on the surface of the workpiece.

10. The method in accordance with claim 9, wherein the platen is coupled to a mounting bracket that couples the platen to a positioning apparatus, the method further comprising controlling operation of the positioning apparatus while performing the automated finishing operation on the surface of the workpiece.

11. The method in accordance with claim 10, wherein the positioning apparatus comprises a movable cart, the method further comprising controlling operation of the movable cart while performing the automated finishing operation on the surface of the workpiece.

12. The method in accordance with claim 8, wherein performing the automated finishing operation further comprises applying one of paint and printer ink onto the surface of the workpiece with the finishing operation end effector.

13. The method in accordance with claim 9, wherein the finishing module comprises a base and an end effector positioning device connecting the finishing operation end effector to the base, wherein positioning the finishing apparatus comprises operating the end effector positioning device to change a position and an orientation of the finishing operation end effector relative to the surface of the workpiece.

14. The method in accordance with claim 8, wherein the platen includes a plurality of orifices, wherein the method further comprises discharging air through the plurality of orifices to create an air gap between the platen surface and the finishing module.

15. The method in accordance with claim 8, the method further implemented using a finishing module controller of the finishing module, the method further comprising controlling, using the finishing module controller, the magnetic flux to move the finishing module through a predetermined path over the platen surface.

16. A finishing station for performing an automated finishing operation on a surface of a workpiece, the finishing station comprising:
   a platen fabricated from a magnetic material and having a platen surface;
   a finishing module disposed on the platen surface and having a finishing operation end effector, wherein the finishing module generates a magnetic field that biases the finishing module toward the platen, and is operable to generate a magnetic flux to control movement of the least one finishing module over the platen surface to perform the automated finishing operation on the surface of the workpiece; and
   a finishing module controller coupled in communication with the finishing module, the finishing module controller configured to control the magnetic flux generated by the finishing module to move the finishing module over the platen surface to perform the automated finishing operation.

17. The finishing station in accordance with claim 16, comprising a positioning apparatus coupled to the platen, wherein the positioning apparatus supports the platen adjacent to the surface of the workpiece while the finishing module performs the automated finishing operation on the surface of the workpiece.

18. The finishing station in accordance with claim 17, wherein the positioning apparatus comprises an omni-cart, wherein the omni-cart is configured to traverse along at least a part of the workpiece during the automated finishing operation.

19. The finishing station in accordance with claim 16, wherein the finishing module controller is further configured to control the magnetic flux generated by the finishing module to move the finishing module over the platen surface through a predetermined path.

20. The finishing station in accordance with claim 16, wherein the finishing module controller is further coupled in communication with the finishing operation end effector to perform the automated finishing operation.

\* \* \* \* \*